US008479262B2

(12) United States Patent
Diaz et al.

(10) Patent No.: US 8,479,262 B2
(45) Date of Patent: Jul. 2, 2013

(54) MANAGING ELECTRONIC DEVICES USING AN ELECTRONIC DEVICE AS A ROOT OF TRUST

(75) Inventors: Osvaldo Diaz, San Mateo, CA (US); Mamoun Abu-Samaha, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 436 days.

(21) Appl. No.: 12/866,909

(22) PCT Filed: Oct. 31, 2008

(86) PCT No.: PCT/US2008/081958
§ 371 (c)(1),
(2), (4) Date: Aug. 10, 2010

(87) PCT Pub. No.: WO2009/102354
PCT Pub. Date: Aug. 20, 2009

(65) Prior Publication Data
US 2010/0325740 A1      Dec. 23, 2010

Related U.S. Application Data

(60) Provisional application No. 61/028,313, filed on Feb. 13, 2008, provisional application No. 61/028,315, filed on Feb. 13, 2008, provisional application No. 61/028,319, filed on Feb. 13, 2008.

(51) Int. Cl.
*G06F 9/04*       (2006.01)

(52) U.S. Cl.
USPC ............................................................ 726/3

(58) Field of Classification Search
USPC ............................................................ 726/3
See application file for complete search history.

(56) References Cited

U.S. PATENT DOCUMENTS 6,198,751 B1    3/2001  Dorsey et al.
6,757,734 B1    6/2004  Reserius et al.
6,782,349 B2    8/2004  Challener et al.
(Continued)

FOREIGN PATENT DOCUMENTS

KR    10-2005-0030071    3/2005

OTHER PUBLICATIONS

International Search Report and Written Opinion, dated Feb. 26, 2009, 11 pages.

(Continued)

*Primary Examiner* — Michael S McNally
*Assistant Examiner* — Daniel Hoang

(57) ABSTRACT

Various embodiments pertain to managing electronic devices using an electronic device as a root of trust. According to one embodiment, registration information for an electronic device 150 is received 220. The registration information identifies the electronic device 150 and an environment 130 that the electronic device 150 is trusted in. The electronic device 150 is specified 230 as a root of trust device 150 for the trusted environment 130 based on the registration information. The root of trust device 150 is specified 240 as the root of trust for a new electronic device 170 based on new information that identifies the root of trust device 150 and identifies the new electronic device 170. The new electronic device 170 is managed 250 using the root of trust device 150 without requiring the user of the root of trust device 150 and the new electronic device 170 to configure any electronic devices.

15 Claims, 5 Drawing Sheets

U.S. PATENT DOCUMENTS

| | | |
|---|---|---|
| 6,970,909 B2 | 11/2005 | Schulzrinne |
| 7,216,369 B2 | 5/2007 | Wiseman et al. |
| 7,254,722 B2 | 8/2007 | Catherman et al. |
| 7,921,286 B2 * | 4/2011 | Wooten .................. 713/164 |
| 2002/0199030 A1 * | 12/2002 | Webber .................. 709/312 |
| 2003/0118353 A1 | 6/2003 | Baller et al. |
| 2004/0032881 A1 | 2/2004 | Arai |
| 2005/0055453 A1 | 3/2005 | Zhu |
| 2005/0232175 A1 | 10/2005 | Draluk et al. |
| 2005/0234967 A1 | 10/2005 | Draluk et al. |
| 2006/0010232 A1 | 1/2006 | Page et al. |
| 2006/0015626 A1 | 1/2006 | Hallamaa et al. |
| 2006/0031449 A1 | 2/2006 | Hallamaa et al. |
| 2006/0036763 A1 * | 2/2006 | Johnson et al. .......... 709/238 |
| 2006/0168268 A1 | 7/2006 | Barrett et al. |
| 2006/0203722 A1 | 9/2006 | Oommen |
| 2006/0217111 A1 | 9/2006 | Marlia et al. |
| 2006/0236325 A1 | 10/2006 | Rao et al. |
| 2006/0262732 A1 | 11/2006 | Joutsenvirta et al. |
| 2007/0067817 A1 | 3/2007 | Hamilton et al. |
| 2007/0093243 A1 | 4/2007 | Kapadekar et al. |
| 2007/0189301 A1 | 8/2007 | Kiss et al. |
| 2008/0046271 A1 | 2/2008 | Jeong et al. |
| 2008/0126334 A1 | 5/2008 | Laine et al. |
| 2008/0133718 A1 | 6/2008 | Bouchat et al. |
| 2008/0194231 A1 | 8/2008 | Kim et al. |
| 2008/0244049 A1 | 10/2008 | Normark et al. |
| 2009/0037367 A1 | 2/2009 | Wein |
| 2009/0132698 A1 | 5/2009 | Barnhill et al. |
| 2009/0191841 A1 | 7/2009 | Edge et al. |
| 2009/0199176 A1 | 8/2009 | Nath et al. |

OTHER PUBLICATIONS

International Search Report and Written Opinion received in PCT Application No. PCT/US2008/081934, mailed May 25, 2009, pp. 10.

International Search Report and Written Opinion received in PCT Application No. PCT/US2008/081949, mailed Apr. 29, 2008, pp. 10.

The Broadband Forum, TR-069: CPE WAN Management Protocol v1.1 Version: Issue 1 Amendment 1 [online], Version Date: Nov. 2006 [retrieved on Sep. 4, 2012]. Retrieved from the Internet: <URL: http://www.broadbandforum.org/technical/download/TR-069_Amendment-1.pdf>. pp. 1-10.

* cited by examiner

MANAGING ELECTRONIC DEVICES USING AN ELECTRONIC DEVICE AS A ROOT OF TRUST

RELATED APPLICATIONS

This patent application claims priority to and benefit of the co-pending U.S. Provisional Patent Application No. 61/028,319, and is entitled "Remote Management with Translation Between OMA-DM and WSMAN" by Osvaldo Diaz et al., filed on Feb. 13, 2008.

This patent application claims priority to and benefit of the co-pending U.S. Provisional Patent Application No. 61/028,313, and is entitled "Hosted Management Server Supporting Multiple Management Frameworks" by Osvaldo Diaz et al., filed on Feb. 13, 2008.

This patent application claims priority to and benefit of the co-pending U.S. Provisional Patent Application No. 61/028,315, and is entitled "Trusted Appliance in User Premises Capable of Managing Devices While Facilitating Remote Management" by Osvaldo Diaz et al., filed on Feb. 13, 2008.

This Application is related to U.S. patent application Ser. No. 12/866,933 by Osvaldo Diaz et al., filed on the same date as the present application and entitled "Providing Manageability to an Electronic Device That Supports Location Limited Manageability Functionality" assigned to the assignee of the present application.

This Application is related to U.S. patent application Ser. No. 12/866,781 by Osvaldo Diaz et al., filed on the same date as the present application and entitled "Managing Electronic Devices with Different Types of Device Location Limited Device Management Clients", assigned to the assignee of the present application.

BACKGROUND

Management can be provided to electronic devices by configuring the electronic devices and diagnosing problems associated with the electronic devices, among other things. Most management applications associated with an electronic client device that work over the Internet and are installed behind firewalls. This requires the user to install applications and to configure their electronic devices in various ways, which include opening up ports. Many users, such as people that buy electronic devices for their homes, their small-sized businesses or their medium-sized businesses, want their electronic devices managed in a secure manner but do not know how to configure their electronic devices, among other things.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

Figure 1:
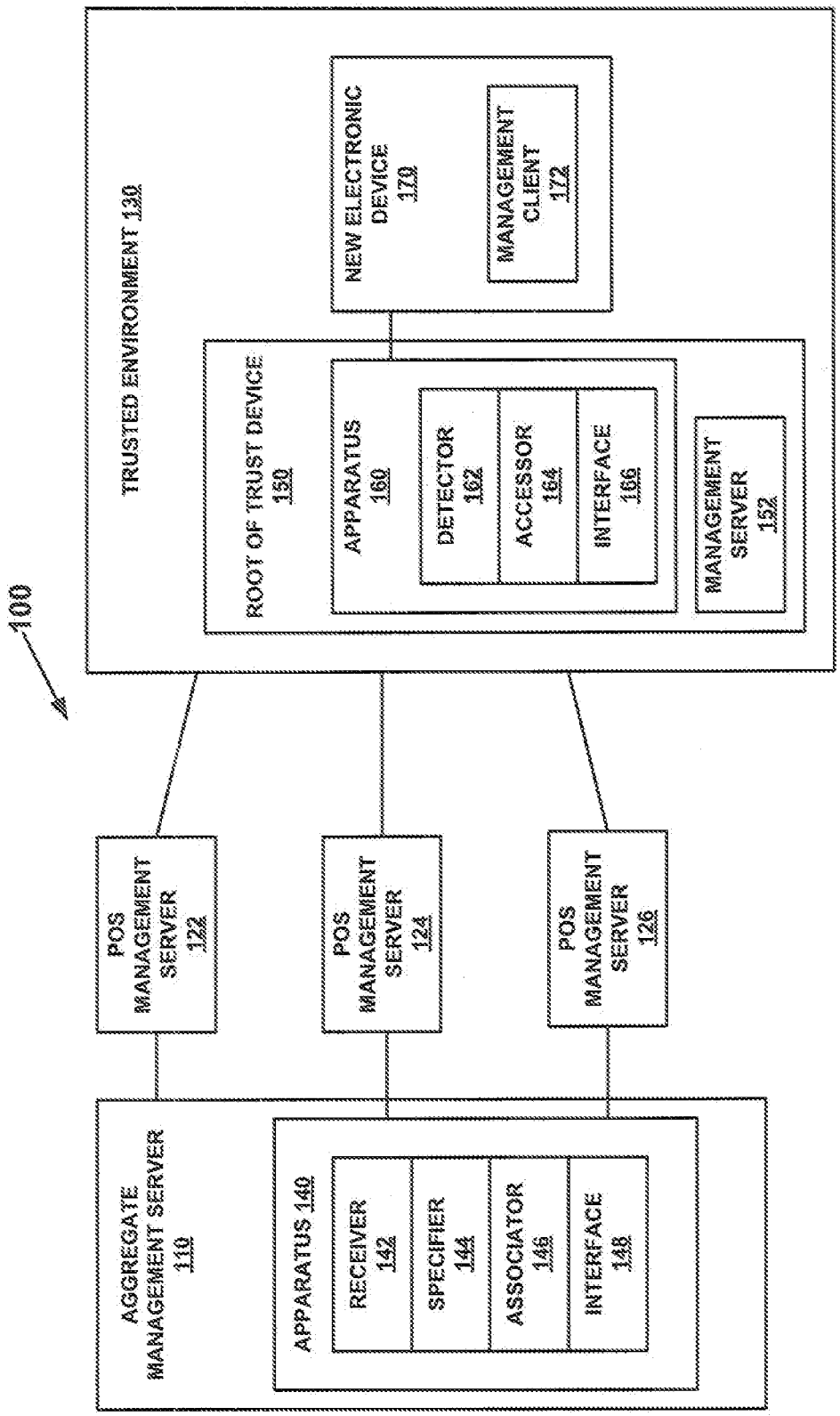
FIG. 1 is a block diagram of a system for managing electronic devices using an electronic device as a root of trust for a trusted environment, according to one embodiment.

The drawings referred to in this description are not drawn to scale except if specifically noted.

DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of various embodiments of the present invention, numerous specific details are set forth in order to provide a thorough understanding of the present invention. In other instances, well-known methods, procedures, protocols, services, components, and circuits have not been described in detail so as not to unnecessarily obscure aspects of the present invention.

According to one embodiment, electronic devices are managed using a root of trust device in a trusted environment in order to ensure that the electronic device is inherently secure upon startup. A trusted environment ensures that the electronic device has protection of its data, privacy, and other rights of the user. Examples of such management include, but are not limited to, automatically configuring the electronic devices and diagnosing problems for the user securely. An owner of a home appliance may register their home appliance as a root of trust by providing information that can be used to identify the home appliance. When the owner buys a new electronic device, the owner can provide the store with information about the new electronic device and the root of trust device so that the root of trust device becomes the root of trust for the new electronic device in a trusted environment, such as the owner's home.

The root of trust device provides secure communication between the new electronic device and a management server, for example, over the Internet. The management server uses the provided information about the root of trust device and the new electronic device to manage the new electronic device via the root of trust device without requiring the owner of the device to perform any configuring, as will become more evident. Examples of configuring include, but are not limited to, installing software and opening up ports, among other things. As will become more evident, a root of trust device can be used as a part of managing an electronic device, for example, by enabling automatic configuration of the electronic device, or by enabling automatic diagnosis of problems associated with the electronic device, among other things.

Although many examples provided herein refer to a trusted environment that is a home, various embodiments are well suited to other types of trusted environments, such as a business premise. Although many of the examples provided herein refer to the owner of the root of trust device or the new electronic device, the owner is just one example of a user and various embodiments are well suited to any user of the root of trust device. Although many of the examples herein refer to a root of trust device that is a home appliance, a home appliance is just one example of a device that can be a root of trust.

FIG. 1 depicts a system for managing electronic devices using an electronic device as a root of trust for a trusted environment, according to one embodiment. The blocks that represent features in FIG. 1 can be arranged differently than as illustrated, and can implement additional or fewer features than what are described herein. Further, the features represented by the blocks in FIG. 1 can be combined in various ways. The system 100 can be implemented using software, hardware, firmware, or a combination thereof.

System 100 includes a trusted environment 130, with a root of trust device 150, a new electronic device 170, an aggregate management server 110, POS management servers 122-126, an apparatus 140 associated with the aggregate management server 110 and an apparatus 160 associated with the root of trust device 150. The root of trust device 150, according to one embodiment, includes a light weight management server 152 that the root of trust device 150 was configured with prior to when the owner of the root of trust device 150 took possession of root of trust device 150. According to one embodiment, the new electronic device 170 includes a management client 172 that the root of trust device's 150 management server 152 can communicate with. The aggregate management server 110 includes information about the root of trust device 150 that was provided to the aggregate management server 110, for example, when the root of trust device 150 was registered. According to one embodiment, secure HTTP is used to communicate between the root of trust device 150 and the aggregate and POS management servers 110, 122-126. The root of trust device 150 provides, according to one embodiment, secure communications between an electronic device, such as electronic device 170, associated with a trusted environment 130 and a POS management server 122-126 associated with the POS that an electronic device was bought from, or an aggregate management server 110, or a combination, thereof.

For the sake of simplicity, system 100 depicts only one electronic device 170 behind the root of trust device 150. However, various embodiments are well suited for the root of trust device 150 serving as the root of trust for a plurality of electronic devices 170 associated with the trusted environment 130.

The apparatus 140 associated with the aggregate management server 110 includes a (managing-devices-in-a-trusted-environment-without-requiring-device-user-to-configure-using-root-of-trust-device-registration-information-receiver 142 (referred to hereinafter as the "receiver"), a managing-devices-in-a-trusted-environment-without-requiring-device-user-to-configure-using-root-of-trust-device-specifier 144 (referred to hereinafter as the "specifier"), a managing-devices-in-a-trusted-environment-without-requiring-device-user-to-configure-using-root-of-trust-ro-new-device-associator 146 (referred to hereinafter as the "associator"), and a managing-devices-in-a-trusted-environment-without-requiring-device-user-to-configure-using-root-of-trust-device-new-device-management-interface 148 (referred to hereinafter as the "interface"). The receiver 142 is configured for receiving registration information for an electronic device 150, wherein the registration information identifies the electronic device 150 and an environment 130 that the electronic device 150 is trusted in. The specifier 144 is configured for specifying the electronic device 150 as the root of trust device 150 for the trusted environment 130 based on the registration information. The associator 146 is configured for specifying the root of trust device 150 as the root of trust for a new electronic device 170 based on new information that identifies the root of trust device 150 and identifies the new electronic device 170. The interface 148 is configured for managing the new electronic device 170 using the root of trust device 150 without requiring the user of the root of trust device 150 and the new electronic device 170 to configure any electronic devices.

The apparatus 160 associated with the root of trust device 150 includes a managing-devices-in-a-trusted-environment-associated-with-a-root-of-trust-device-without-requiring-device-user-to-configure-using-new-device-detector 162 (also referred to herein as a "detector"), a managing-devices-in-a-trusted-environment-associated-with-a-root-of-trust-device-without-requiring-device-user-to-configure-using-root-of-trust-accessor 164 (also referred to herein as an "accessor"), and a managing-devices-in-a-trusted-environment-associated-with-a-root-of-trust-device-without-requiring-device-user-to-configure-using-device-management-interface 166 (also referred to herein as an "interface"). The detector 162 is configured for detecting that a new electronic device 170 has been associated with a trusted environment 130 that the root of trust device 150 is the root of trust for. The accessor 164 is configured for accessing a root of trust identifier that identifies the electronic device 150 as the root of trust device 150 for a new electronic device 170 associated with the trusted environment 130. The interface 166 is configured for managing the new electronic device 170 using the root of trust device 150 without requiring the user of the root of trust device 150 and the new electronic device 170 to configure any electronic devices 150, 170.

According to various embodiments, one electronic device 150 can serve as a root of trust to other electronic devices 170 in a trusted environment 130. An electronic device 150, 170 may be a mobile device such as a cell phone, a laptop, or a personal digital assistant (PDA), among other things. An electronic device 150, 170 may be a device that is used in a home, such as a router, a gateway, a modem, a kitchen appliance, a television, a set-top-box, a computer, a printer, and a laptop, among other things. An electronic device 150, 170 may be a device that is used for work (also referred to herein as "work devices"), such as routers, a modem, a gateway, a computer, a laptop, a phone, a PDA, and a printer, among other things. Work devices may be associated with a company or an enterprise that traditionally provides information technology or does not provide information technology. A company may be a small, medium or large-sized company. An electronic device 150, 170 may be a computer based device, such as a desk top computer, a laptop, or a server device, among other things. An electronic device 150, 170 may be a client device or a server device.

A new electronic device 170 is typically bought from a local store, over the Internet, etc., each of which can be referred to as a point of sale (POS). Examples of POSes are a local Best Buy™ store or a local store that sells cell phones, such as Cingular™. POSes may provide a certain amount of technical support for the electronic devices 170 that they provide.

A trusted environment 130 is an environment where one electronic device 150 is trusted to serve as the root of trust for one or more other electronic devices 170 that are used in that trusted environment 130. Examples of trusted environments 130 include, but are not limited to, a home or the premise of a business. The business may be a small, medium, or large sized-business.

A root of trust device 150 is an electronic device that serves as a root of trust for other electronic devices 170 in a trusted environment 130. The root of trust device 150 may have been configured to be a root of trust when it was manufactured, at the store that sold the root of trust device 150, as a part of registering the root of trust device 150 at the store where it was bought, over the phone after the root of trust device 150 was bought, among other things. According to one embodiment, a root of trust device 150 is configured to provide secure communication through a standard hypertext transfer protocol (HTTP) port 80.

A root of trust device 150 enables management of electronic devices 170 that are associated with a trusted environment 130 without requiring a user of either the root of trust device 150 or the electronic devices 170 to install applications and to configure their electronic devices 150, 170 in various ways, which includes opening up ports. A server 110 and a root of trust device 150 manage an electronic device 170, according to one embodiment, using what are known as "management platforms. A management platform defines a standard that software, also referred to herein as an "entity," can be developed around, according to one embodiment. One entity is typically a managing entity that manages another entity (also referred to as "a managed entity") and by extension manages the device that a managed entity resides on. For example, referring to FIG. 1, according to one embodiment, the electronic device 170 includes a managed entity in the form of a management client 172 and the aggregate management server 110, the POS management servers 122, 124, 126, are examples of managing entities that the electronic device 170's management client 172 to manage the electronic device 170. Entities 110, 122, 124, 126, 152,172 that conform to related management platforms can communicate with each other 110, 122, 124, 126, 152, 172 with a corresponding management protocol. Although many of the embodiments are described in terms of entities 110, 122, 124, 126, 152, 172 that are software, entities 110, 122, 124, 126, 152, 172 that conform to management platforms may also be implemented using hardware or firmware, or a combination of any two or more of software, hardware, or firmware.

Examples of management platforms that have corresponding management protocols are Open Mobile Alliance Device Management (OMA-DM), Web Services Management (WS-MAN), Simple Network Management Protocol (SNMP), Technical Requirement-069 (TR-069), and TR-111. The entities typically use a communication protocol, such as TCP-IP, to transmit information that conforms to the respective management protocol to enable a managing entity 110 to manage a managed entity 172.

As will become more evident, management platforms and their respective management protocols can be either location agnostic or location limited. The entities 110, 122, 124, 126, 152, 172 may be location agnostic or location limited or a combination thereof. Further, as will become more evident, a translation apparatus can be used to bridge communications between a location agnostic entity and a location limited entity.

Location agnostic device management pertains to managing devices 150, 170 regardless of where the devices 150, 170 are located. A location agnostic protocol is a management protocol that can be used for communicating between entities 110, 122, 124, 126, 152, 172 regardless of where the devices 150, 170 are located. The location agnostic protocol, according to one embodiment, is a hypertext transfer protocol (HTTP) extensible markup language (XML) based protocol that can be used, for example, by phones. The location agnostic protocol may enable part of the communications to be transmitted over the Internet and may use short message service (SMS), for example, to initiate communications. A location agnostic protocol can be used, for example, to communicate via one or more cell phone towers and the Internet. An example of a location agnostic protocol is the Open Mobile Alliance Device Management (OMA DM) protocol.

Since a location agnostic protocol can be used to communicate via one or more cell phone towers and the Internet, a location agnostic protocol can be used to communicate with electronic devices 150, 172 regardless of where they are located. For example, a location agnostic protocol can be used to communicate with an electronic device 170 even when that electronic device 170 moves. In another example, a location agnostic protocol can be used to communicate with an electronic device 170 that is behind a network address translation (NAT) table, behind a firewall, or behind a gateway.

A location agnostic entity 110, 122, 124, 126, 152, 172 may be a client or a server, among other things, that conforms to a location agnostic management platform, such as OMA-DM. A minimal interface, such as what is commonly known as a "proxy client," may be used to provide a location agnostic client.

Electronic devices 150, 170 that are associated with a trusted environment 130 may have location limited device management associated with them. Location limited device management pertains to managing devices 150, 170 but restricts where those devices 150, 170 are located. That is, location limited device management can only be used to manage devices 150, 170 while the devices 150, 170 are in a particular physical or electronic (network) location. For example, the devices 150, 170 may be restricted to a network associated with an enterprise or a home. A location limited protocol is a management protocol that can be used for communicating between entities 110, 122, 124, 126, 152, 172 that reside on devices while those devices are associated with a particular area or a particular network. Examples of location limited protocols are Web Services Management (WSMAN), Simple Network Management Protocol (SNMP), Technique Requirement-069 (TR-069), and TR-111.

Many electronic devices are traditionally configured to communicate using location limited protocols. For example, many computer based devices are configured to use the WSMAN protocol. In another example, many chip sets are configured to use the WSMAN protocol. In yet another example, many televisions are configured to use TR-111. In still another example, many routers and modems are configured to use TR-069.

A location limited entity 10, 122, 124, 126, 152, 172 may be a client or a server, among other things, that conforms to a location limited management platform, such as WSMAN, SNMP, TR-069, or TR-111. A location limited entity 152, 172 may reside on an electronic device 150, 170, such as a mobile device, a television, a computer based device, or a router, among other things.

Management servers may be associated with the POSes (referred to herein as "POS management servers") that have information pertaining to the electronic devices 170 that the POSes have sold and an aggregate management server 110 may have information about the electronic devices 170 for various POSes that have contracted with a company (referred to herein as a "contracted company"), such as HP™ or China Mobile™, that the aggregate management server 110 is associated with.

The POS management servers 122, 124, 126 and the aggregate management server 110, according to one embodiment, are device location agnostic device management servers (also referred to as a "location agnostic servers") such as OMA-DM servers.

According to one embodiment, a root of trust device 150 also has a management server 152. The root of trust device 150, according to one embodiment, may have been configured with a management server 152 when it was manufactured, or at the store that sold the root of trust device, among other things. The root of trust device 150's management server 152 may be a light weight management server. A light weight management server, according to one embodiment, does not have all of the functionality of a regular management server. More specifically, engineers may determine what functions their management server 152 will be using and implement only those functions that it will use. Further, the management server 152 may be a location agnostic server, such as OMA-DM. The root of trust device 150 can provide secure communications between the electronic device 170's management client 172 and one or more of the POS management server 122, 124, 126 and the aggregate management server 110.

The aggregate management server 110 and the POS management servers 122, 124, 126, according to one embodiment, have different kinds of information. For example, a POS management server 122, 124, 126 has information about the electronic devices 170 that are sold by a POS and the aggregate management server 110 has information about the electronic devices 170 for a plurality of POS management servers 122, 124, 126. For example, the aggregate management server 110 may have information about electronic devices 170 bought from several POSes that the company associated with the aggregate management server 110 has been, for example, contracted to provide a certain level of management for.

The aggregate management server 110 and the POS management servers 122, 124, 126 may also have different kinds of authorizations. Examples of authorization may pertain to what types of management a POS management server 122, 124, 126 and an aggregate management server 110 are authorized to provide.

The aggregate management server 110 may also have information pertaining to Quality of Service (QOS) agreements, for example, between POSes and the contracted company. In another example, the QOS agreements may reflect agreements for levels of service between a purchaser of a new device 170 and the POS they bought the new device 170 from.

The aggregate management server 110 may also use policies that are used for determining types of management to provide for different types or categories of electronic devices 170.

According to one embodiment, electronic devices 170 associated with a trusted environment 130 are provided with levels of management. For example, although POSes may provide a certain amount of technical support for the electronic devices 170 that they sell, the POSes may encounter problems that are beyond their ability to handle. In those cases, a higher level of management can be provided by an aggregate management server 110 associated with, for example, traditional IT enterprise companies, such as Hewlett Packard™ (HP™), or carriers, such as China Mobile™ or AT&T™. Therefore, the management servers 122, 124, 126 associated with POSes may be used to provide one level of management and the aggregate management server 110, which may be associated with a traditional IT enterprise company, can be used to provide a higher level of management.

According to one embodiment, one or more levels of management are provided. The following is an example of three levels of management. One level of management may be provided with the root of trust device 150, a second level may be provided with a POS management server 122, 124, 126 and a third level may be provided with an aggregate management server 110. However, three levels of management are not required. For example, the POSes may decide to not provide any management themselves therefore, one level of management may be provided with a root of trust device 150 and a second level may be provided with an aggregate management server 110. In another example, the POSes may decide to not contract with another company to provide another level of management, therefore, one level may be provided with a root of trust device 150 and a second level may be provided with a POS management server 122, 124, 126 without a third level being provided by an aggregate management server 110. In yet another example, a management server may not reside on the root of trust device 150 and therefore one or two levels of management may be provided. For example, one level of management may be provided by either a POS management server 122, 124, 126 or an aggregate management server 110 but not provided by the root of trust device 150. In a second example, two levels of management may be provided by a POS management server 122, 124, 126 and an aggregate management server 110.

Various types of information are provided, for example, about the root of trust device 150, the new electronic device 170, or the owner of the root of trust device 150, or a combination thereof, for example, to one or more of the POS management servers 122, 124, 126, or the aggregate management server 110, or a combination thereof, among other things.

The provided information may be registration information for the root of trust device 150. Examples of registration information include any one or more of information identifying the owner, such as the owner's email address, phone number, address, a unique identification of the root of trust device, among other things.

The registration information can also be used to determine what environment 130 the root of trust device 150 is trusted in. For example, the information can be used to determine that the root of trust device 150 is trusted in the owner's home or in the owner's business premise.

Information that identifies the new electronic device 170 includes, among other things, unique identifications of the new electronic device 170. Information that can be used to specify the root of trust device 150 as the root of trust for a new electronic device 170 include, but are not limited to, the owner's name, address, phone number, email address, the type of device that the root of trust device 150 is, or a unique identification of the root of trust device 150.

Examples of unique identifications of a root of trust device 150 or a new electronic device 170 include, but are not limited to, a media access control (MAC) address, a Universally Unique Identifier (UUID), a Globally Unique Identifier (GUID), and an International Mobile Equipment Identity (IMEI).

As will become more evident, the root of trust device 150, according to one embodiment, can provide its unique identifier to another entity, such as an aggregate management server 110 or a POS management server 122, 124, 126 to identify that the root of trust device 150 is a valid root of trust. The unique identifier can be used to determine what electronic devices 170 the root of trust device 170 is a root of trust for.

Figure 2:
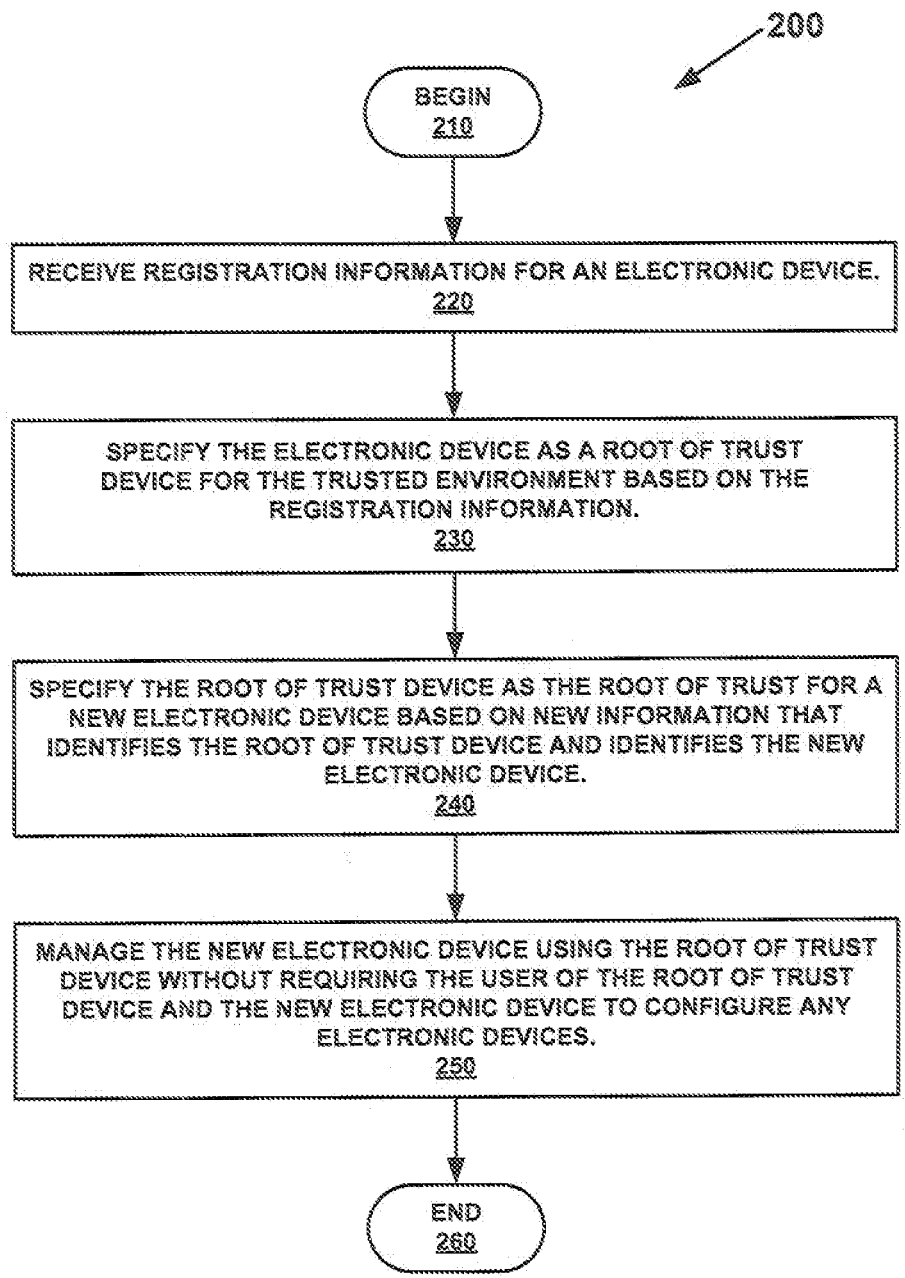
FIG. 2 is a flowchart of a method for managing electronic devices using an electronic device as a root of trust for a trusted environment, according to one embodiment.

FIG. 2 is a flowchart of a method for managing electronic devices using an electronic device as a root of trust for a trusted environment, according to one embodiment. Although specific steps are disclosed in flowchart 200, such steps are exemplary. That is, embodiments of the present invention are well suited to performing various other steps or variations of the steps recited in flowchart 200. It is appreciated that the steps in flowchart 200 may be performed in an order different than presented, and that not all of the steps in flowchart 200 may be performed.

Assume that the root of trust device 150 has been configured to be a root of trust when it was manufactured, etc . . . as described herein. The root of trust device 150 may have been configured with an apparatus 160 as a part of configuring it as a root of trust. Also assume that the new electronic device 170 is a home appliance that was bought from a POS that POS management server 122 is associated with.

At step 210, the method begins.

At step 220, registration information for an electronic device is received. The registration information identifies the electronic device 150 and an environment 130 that the electronic device 150 is trusted in. For example, an owner of the electronic device 150 may register the electronic device 150 as a root of trust device 150. The information the owner provides to register their electronic device 150 as a root of trust may include any one or more of information identifying the owner, such as the owner's email address, phone number, address, a unique identification of the electronic device 150, among other things. The registration information can also be used to determine what environment 130 the electronic device 150 is trusted in. For example, the information can be used to determine that the electronic device 150 is trusted in the owner's home 130. The receiver 142 associated with aggregate management server 110's apparatus 140 receives the registration information. The received registration information may be stored in memory that can be accessed by the aggregate management server 110.

At step 230, the electronic device is specified as a root of trust device for the trusted environment based on the registration information. For example, the aggregate management server 110's specifier 144 can receive the registration information from the aggregate management server 110's receiver 142. The specifier 144 can use the registration information to specify the electronic device 150 as the root trust for the owner's home 130 to the aggregate management server 110.

At step 240, the root of trust device is specified as the root of trust for a new electronic device based on new information that identifies the root of trust device and identifies the new electronic device. For example, new information that identifies the root of trust device 150 and identifies a new electronic device 170 is received. In a specific example, assume that the owner of the root of trust device 150 goes to a point of sale (POS), such as Best Buy™ or Cingular™, and buys a new electronic device 170.

As a part of registering the new electronic device 170 with the POS, the owner provides information to the POS that identifies the owner's root of trust device 150. The identification of the root of trust device 150 can be used to assign the device 150 as the root of trust for the new electronic device 170. In this illustration, assume that the information that identifies the root of trust device 150 is the email address of the root of trust device 150's owner.

Information that identifies the new electronic device 170 is also used as a part of associating the new electronic device 170 with the root of trust device 150. For example, assume that the new electronic device 170 is a cell phone 170 so an IMEI may be used to identify the new electronic device 170.

In this illustration, POS management server 122 is associated with the POS the new electronic device 170 was bought from. The POS management server 122 can communicate the new electronic device 170's information (make, model, version, IMEI) and the email address of the root of trust 150's owner to the aggregate management server 110, according to one embodiment. The aggregate management server 110 can use the new electronic device 170's IMEI and the email address to specify that the electronic device 150 is the root of trust for the new electronic device 170.

Assume that the owner takes the new electronic device 170 home. The root of trust device 150's detector 162 detects the presence of the new electronic device 170, or vice versa, and communication between the root of trust device 150 and the new electronic device 170 is initiated to auto register the new electronic device 170, according to one embodiment. The new electronic device 170 may be detected because it is brought within a certain range of the root of trust device 150, because it is plugged into the root of trust device 150 or because it uses a network that the root of trust device 150 is also associated with, among other things.

As a part of the new electronic device 170 auto registering with the root of trust device 150 in the trusted environment 130, the root of trust device 150 can communicate the new electronic device's 170 profile and other information to the aggregate management server 110. The aggregate management server's 110 associator 146 can use the new electronic device 170's information or the information gathered during auto-registration, or a combination thereof as a part of specifying that electronic device 150 is the root of trust for the new electronic device 170.

At step 250, the new electronic device is managed using the root of trust device without requiring the user of the root of trust device and the new electronic device to configure any electronic devices. For example, since the root of trust device 150, according to one embodiment, was configured with an apparatus 160, for example, when the root of trust device 150 was manufactured, etc . . . as described herein, the root of trust device 150 does not require a user of the root of trust device 150 or a user of the new electronic device 170 to configure any electronic devices 150, 170. More specifically, assume for the sake of illustration that the new electronic device 170 needs updated software or needs to be diagnosed. As a part of managing the new electronic device 170, the root of trust device 150's accessor 164 can access a unique identifier, associated with the root of trust device 150. The root of trust device 150's unique identifier can be provided to another entity, such as an aggregate management server 110 or a POS management server 122, to identify the root of trust device 150 as the root of trust for managing electronic devices 170 associated with the trusted environment 130.

According to one embodiment, either the root of trust device 150's interface 166 or the aggregate management server 110's interface 148, or a combination thereof, can be used to manage electronic devices 170 associated with a trusted environment 130.

Assume that the root of trust device's 150 interface 166 is used to provide management to the electronic devices 170. For example, the interface 166 may communicate with a management server, such as the POS management server 122, or the aggregate management server 110, or a combination thereof. The POS management server 122 and the aggregate management server 110 may also communicate with each other in order to provide various levels of management as described herein. In a specific example, the root of trust device's 150 interface 166 may communicate with the POS management server 122 to determine if the POS can provide the appropriate support. If the POS cannot provide the appropriate support, the POS management server 122 or the root of trust device 150's interface 166 can communicate with the aggregate management server 110 for another level of management.

In another example, assume that new software needs to be installed on one of the electronic devices 170 behind the root of trust device 150. The aggregate management server 110's interface 148 can communicate the new software to the root of trust device 150 which in turn enables installing the new software on the electronic device 170. The software may already be co-located with the aggregate management server 110 or may be obtained from another source such as a POS. In yet another example, if an electronic device 170 behind the root of trust device 150 is encountering problems, the electronic device 170 can communicate with the root of trust device 150's interface 166 which in turn communicates with the aggregate management server 110's interface 148. The aggregate management server 110's interface 148 may be used to communicate between a POS management server 122 and the root of trust device 150 or the aggregate management server 110's interface 148 may be used to communicate between the aggregate management server 110 and the root of trust device 150.

These are just a few examples of how two or more of the root of trust device 150, a POS management server 122, and the aggregate management server 110 can be used to provide management to electronic devices 170 associated with a trusted environment 130. One of ordinary skill in the art would be able to use various embodiments to implement other ways of communicating between two or more of the root of trust device 150, the POS management server 122, and the aggregate management server 110.

At 260, the method ends.

Various embodiments do not require a user to install anything on devices 150, 170 do not require the user to open ports. Various embodiments provide for secure management of electronic devices 150, 170, enable the user of electronic devices 150, 170 to use a self-care web site as well as customer care, can be used to manage more than one electronic device 150, 170 associated with a trusted environment 130, and do not require online trust verification prior to providing any service to electronic devices 150, 170.

A root of trust device 150, according to various embodiments, provides for policy driven auto-registration of electronic devices 170, provides management for one or more electronic devices 170, provides for secure connectivity, and provides for POS support as well as support from an aggregate management server. The provided support, according to one embodiment, complies with an agreed upon QOS.

Management can be provided to electronic devices 150, 170, 122, 124, 126, 110 (FIG. 1) by configuring the electronic devices 150, 170, 122, 124, 126, 110 (FIG. 1) and diagnosing problems associated with the electronic devices 150, 170, 122, 124, 126, 110 (FIG. 1), among other things. A location agnostic entity 310, 440, 460 (FIGS. 3 and 4) or a location limited entity 330, 410, 490 (FIGS. 3 and 4), or a combination thereof, can be associated with an electronic device 150, 170, 122, 124, 126, 110 (FIG. 1), as will become more evident. Further, a translation apparatus 320, 420, 470 and a corresponding mapping 340, 430, 480 (FIGS. 3 and 4) can be used to translate functions between a location agnostic entity 310, 440, 460 (FIGS. 3 and 4) and a location limited entity 330, 410, 490 (FIGS. 3 and 4), as will become more evident.

An electronic device that uses a location limited client ("location limited" shall be used herein to refer to "device location limited management") loses its management capabilities when the electronic device moves outside of an area that the electronic device is configured to use. A network that the electronic device is configured to use is an example of an area where the electronic device is provided manageability via the electronic device's location limited client communicating with a location limited server over the network.

Various embodiments pertain to providing manageability to an electronic device, which supports location limited manageability functionality, even when the electronic device moves outside of the area. For example, a location agnostic entity ("location agnostic" shall be used herein to refer to "device location agnostic device management"), which is capable of providing management regardless of where an electronic device is located, can be installed on the electronic device. The location agnostic entity and the location limited entity associated with the electronic device both provide a variety of functions. Function A provided by the location agnostic entity may provide similar management capabilities as function A' associated with the location limited entity associated with the electronic device. Therefore, according to one embodiment, a mapping between a location agnostic entity's functions and the location limited entity's functions is used as a part of providing manageability even when the electronic device moves outside of an area, as will become more evident.

Conventionally, electronic devices that are behind a network address translation table (NAT) cannot communicate with an entity that provides management, which is on the other side of the network address translation table (NAT). However, various embodiments enable electronic devices behind a NAT to be managed by communicating with the managing entity that is on the other side of a NAT. In another example, a conventional electronic device may be managed only while it is associated with a certain network. The electronic device may or may not be behind a firewall. However, various embodiments enable electronic devices to be managed when the electronic device leaves the network. Various embodiments can also be used for electronic devices that have never been a part of a traditional IT network, such as a cell phone. Various embodiments can be used for devices that cross between a traditional IT enterprise environment and non-traditional IT enterprise environment. Various embodiments can be used for devices for small or medium-sized businesses (SMBs) that do not have traditional IT support capabilities. Therefore, various embodiments are well suited to home devices, which may be behind a NAT or a firewall, or a combination thereof, or a work device, which may be behind a firewall, among other things.

Figure 3:
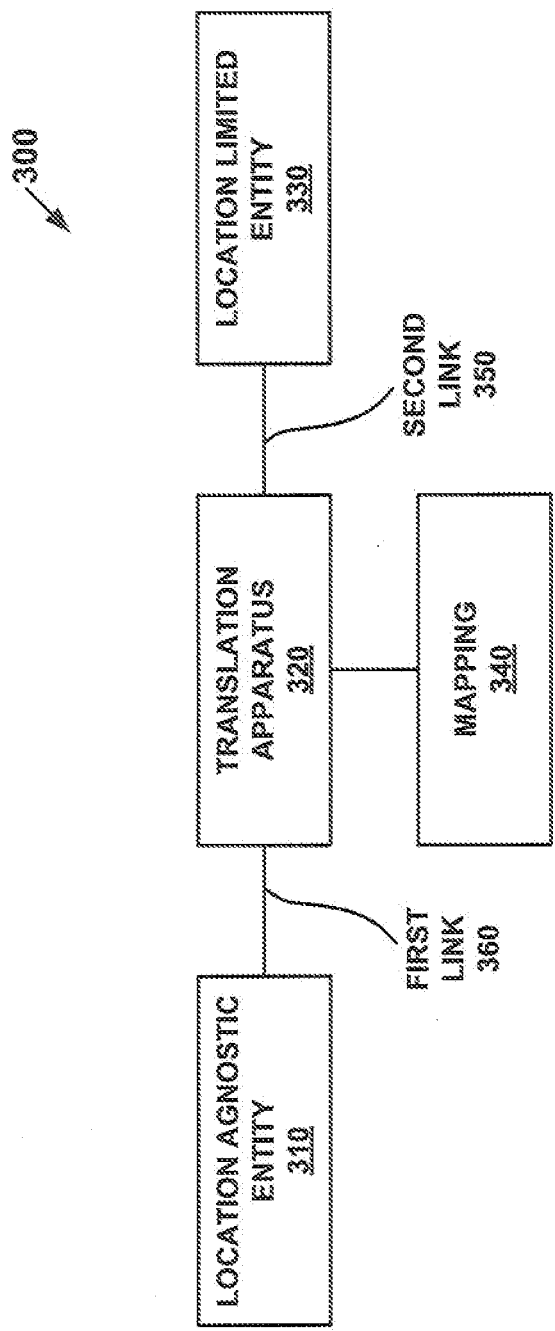
FIG. 3 is a block diagram of a system for translating functions between a location agnostic device management entity and a location limited entity, according to one embodiment.

FIG. 3 is a block diagram of a system 300 for translating functions between a location agnostic device management entity (also known as "location agnostic entity") and a location limited device management entity (also known as "location limited entity"), according to one embodiment. The blocks that represent features in FIG. 3 can be arranged differently than as illustrated, and can implement additional or fewer features than what are described herein. Further, the features represented by the blocks in FIG. 3 can be combined in various ways. The system 300 can be implemented using software, hardware, firmware, or a combination thereof.

The system 300 includes a location agnostic entity 310, a location limited entity 330, a mapping 340 between functions associated with the two entities 310 and 330, and a translation apparatus 320 for translating functions between the two entities 310 and 330.

The entities 310, 330 may be either clients or servers. Either the first link 360 or the second link 350, or both of the links 360, 350 may be a communications link over a network or may be a communications link that resides in an electronic device. The first link 360, or the second link 350 or both of the links 360, 350 may have Wi Fi capabilities.

The apparatus 320 can be co-located with the location agnostic entity 310. For example, the apparatus 320 and the location agnostic entity 310 may reside on the same server or on a network operations center (NOC), among other things. The location agnostic entity 310 and the apparatus 320 may both be associated with a data center for an IT enterprise or reside with a web server.

The apparatus 320 may be co-located with the location limited entity 330. For example, the apparatus 320 and the location limited entity 330 may reside on an electronic client device.

The apparatus 320, the location agnostic entity 310, and the location limited entity 330 may all reside on the same electronic device, may be associated with the same company, or may be associated the same traditional IT enterprise. The electronic device may be a client device or a server device. The server device may be a web server.

The apparatus 320 may be located separately from both the location agnostic entity 310 and the location limited entity 330. For example, the apparatus 320 may be located on an electronic device, such as a server device, that is separate from the electronic devices that the location agnostic entity 310 and the location limited entity 330 reside on. In one embodiment, the location agnostic entity 310, or the apparatus 320, or a combination thereof, reside on a web server. The mapping 340 may be co-located with the translation apparatus 320 or may be located separately from the translation apparatus 320.

Figure 4:
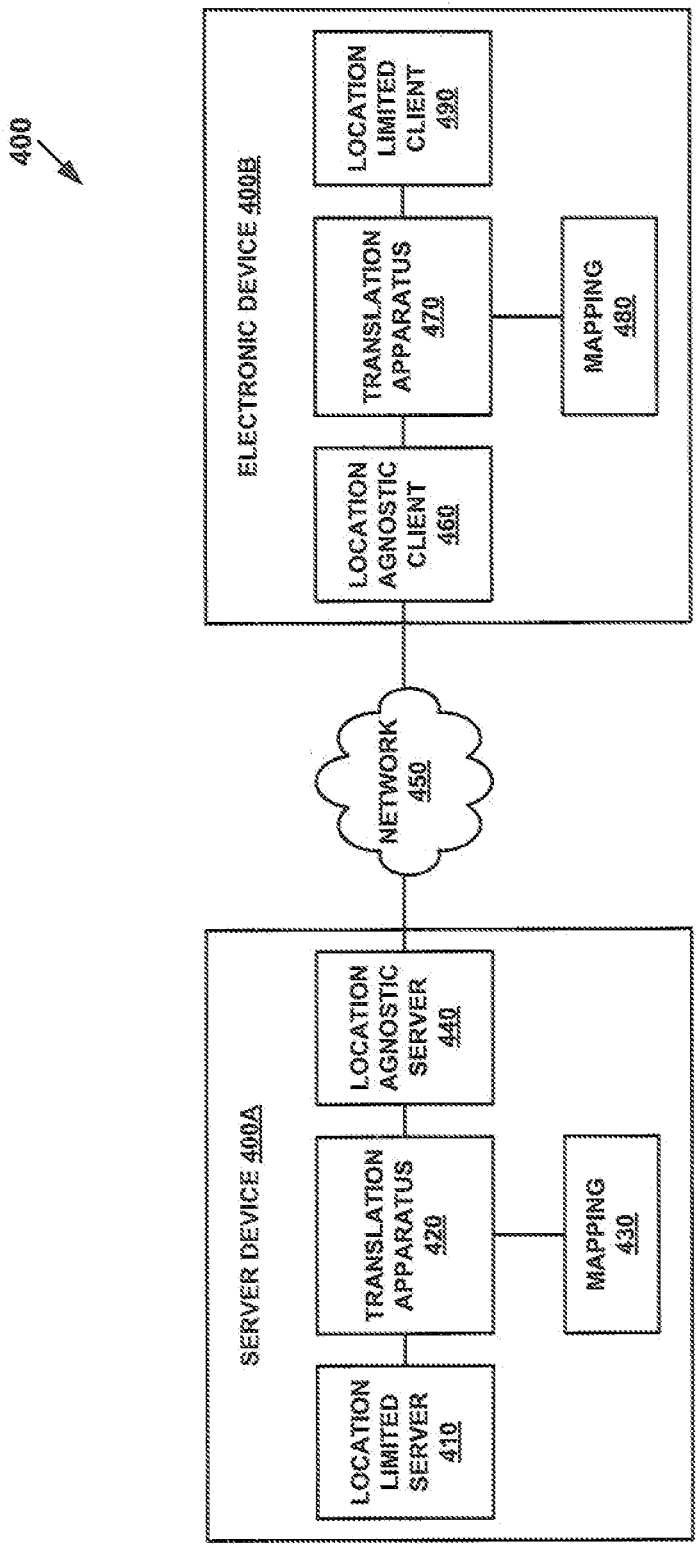
FIG. 4 is a block diagram of a system for translating functions between a location agnostic entity and a location limited entity, according to another embodiment.

FIG. 4 is a block diagram of a system 400 for translating functions between a location agnostic entity and a location limited entity, according to another embodiment. The blocks that represent features in FIG. 4 can be arranged differently than as illustrated, and can implement additional or fewer features than what are described herein. Further, the features represented by the blocks in FIG. 4 can be combined in various ways. The system 400 can be implemented using software, hardware, firmware, or a combination thereof.

As depicted in FIG. 4, the translation can occur between two servers 410, 440 and between two clients 460, 490. For example, the first translation apparatus 420 and its corresponding mapping 430 can translate functions between a location limited server 410 and a location agnostic server 440. The second translation apparatus 470 and its corresponding mapping 480 can translate functions between a location agnostic client 460 and a location limited client 490.

The location limited server 410 and the location limited client 490 are examples of location limited entities 330. The location agnostic server 440 and the location agnostic client 460 are examples of location agnostic entities 310.

Although the server device 400A, as depicted in FIG. 4, includes the servers 410, 440, the translation apparatus 420, and the mapping 430, the server device 400A may include only one or may include more than one of the servers 410, 440, the first translation apparatus 420, or the first mapping 430. The server device 400A may be associated with a service provider. Any one or more of the servers 410, 440, the first translation apparatus 420, or the first mapping 430 can reside at, among other things, a network operations center, an enterprise, or a server device 400A. The server device 400A may be a web server.

Although the client device 400B, as depicted in FIG. 4, includes the clients 460, 490, the translation apparatus 470 and the mapping 480, the client device 400B may include only one or may include more than one of the clients 460, 490, the second translation apparatus 470, and the second mapping 480. The electronic device 400B may be, among other things, a mobile device, an appliance, a router, a model, a television; or a computer.

Communications between various entities depicted in FIG. 4 may be performed over an Internet. For example, the network 450 may be the Internet. Communications between the location agnostic server 440 and the location agnostic client 460 depicted in FIG. 4 may be performed over a network 450 that includes Wireless Fidelity (Wi Fi) capabilities. Although network 450 is the only network depicted in FIG. 4, according to various embodiments, a network may be used to communicate between any of the components 410, 420, 430, 440, 460, 470, 480, 490 depicted in FIG. 4.

According to one embodiment, electronic devices 150, 170 (FIG. 1) can be managed in the context of either a system 300 or system 400. For example, root of trust device 150's management server 152, the new electronic device 170's management client 172 the aggregate management server 110, and the POS management servers 112, 124, 126 (FIG. 1) may each include any one or more of a location agnostic entity 310, translation apparatus 320, mapping 340, and location limited entity 330.

According to one embodiment, the electronic device 170's management client 172 is a location agnostic client that communicates with a location agnostic server 440 that may or may not communicate with a location limited server 410 through a translation apparatus 420. The location limited server 410 may be associated with a POS management server 122, 124, 126. The location limited server 440 may communicate with a location agnostic server 440 associated with the aggregate management server 110, for example, through a translation apparatus. According to another embodiment, the electronic device 170 includes a location agnostic client 470, a translation apparatus 470, a mapping 480, and a location limited client 490. Assuming that the management server 110 includes a location agnostic server 440, the electronic device 170's location agnostic client 470 may communicate with the management server 110's location agnostic server 440 over a network 450.

Management can be provided to electronic devices by configuring the electronic devices and diagnosing problems associated with the electronic devices, among other things. For example, an electronic device can be managed by updating an application or diagnosing an error. In a second example, several electronic devices 400B, such as a television, a personal computer for work, and a laptop may all be connected to a router in a home. The router would use a NAT to provide connectivity for the three devices. The NAT would translate a single real IP address into three pseudo IP addresses for the three devices. Traditionally this has made it very difficult to manage devices 400B that are behind a NAT. Further, many of these devices 400B would have location limited functionality. However, according to various embodiments, a location agnostic protocol can be used to provide manageability to these devices 400B even though they are behind a NAT by communicating with cell phone towers and the Internet.

In another example, a person that works for company X may take their laptop 400B that is configured for company X's network, that is behind a firewall X', to another company Y that has a network behind firewall Y'. Traditionally, one or more firewalls, such as firewall X' and Y', would prevent the person from using their laptop 400B while inside of company Y. However, according to various embodiments, a location agnostic protocol and one or more translation apparatuses 320, 420, 470 and corresponding mappings 340, 430, 480 can enable the laptop 400B to communicate around the firewalls.

In yet another example, a person buys a laptop, a handset phone, or a mobile device from a company that sells electronic devices 400B. Assume that this company is not a traditional IT enterprise but is interested in providing manageability to the devices 400B that they sell. According to various embodiments, the electronic devices 400B they sell may have clients 460 and 490 and a second translation apparatus 470 as depicted in FIG. 4. The company may have servers 410 and 440 and a first translation apparatus 420 as depicted in FIG. 4 to provide the manageability to the electronic devices 400B that the company sells.

In still another example, assume that the electronic device 400B is lost and the user of the electronic device 400B calls up customer services or goes to a self care portal associated with a location agnostic server 440, such as an OMA-DM server, and requests that the hard disk on the electronic device 400B be reformatted or that the electronic device 400B be locked up. The location agnostic server 440 can communicate with the location agnostic client 460 on the electronic device 400B to reform that electronic device 400B's hard disk or to lock the electronic device 400B. Customer care may interact with a user interface associated with the location agnostic server 440 as a part of reformatting the electronic device 400B's hard disk or locking the electronic device 400B.

Other examples where various embodiments may be used include, but are not limited to, different phones with different protocols, different carriers, small or medium businesses that do not have traditional IT infrastructure, changing chip sets in a computer 400B where the original chip set and the new chip set use different protocols for providing manageability, a lost electronic device 400B, locking an electronic device 400B, reformatting hard disk on an electronic device 400B, shredding a hard disk on an electronic device 400B, recovering data, determining what OS was running on a device 400B, which has a crashed disk configuration.

Various embodiments provide a mapping 340, 430, 480 between a device location agnostic entity 310, 440, 460's functions and a device location limited entity 330, 410, 490's functions. According to one embodiment, the device location agnostic entity 310, 440, 460's functions are represented by OMA-DM objects (also known as "managed objects"). For example, a mapping 480 associated with an electronic client device 400B may map managed objects (MOs) to device location limited functions, such as WSMAN functions.

The mapping 340, 430, 480 may map a subset of the functions associated with a device location limited entity 330, 410, 490 and a device location agnostic entity 310, 440, 460. The determination may be made by analyzing what functions are used most often or what functions would provide the greatest business opportunity.

In one embodiment, a translation apparatus 320 and a corresponding mapping 340 may be implemented as a proxy client, which resides, for example, on a Network Operations Center (NOC) server. For example, assume that the location agnostic entity 310, such as an Open Mobile Alliance Device Management (OMA-DM) server, is associated with a service provider's server device, the translation apparatus 320 and corresponding mapping 340 are associated with a proxy client on the NOC server, and the location limited entity 330, such as a WSMAN client, is associated with a user's electronic device. Also assume that the user's electronic device includes a minimal location agnostic client, such as a minimal OMA-DM client. The NOC server with the associated proxy client and the location agnostic entity 310 may be associated with the same data center. The NOC server with the associated proxy client and the WSMAN location limited entity 330 may be associated with the same data center.

A help desk or a user self care web page may communicate with the location agnostic entity 310 which in turn communicates with the proxy client. The proxy client can use the translation apparatus 320 and the mapping 340 to determine a location agnostic function. A data structure representing the determined function can be communicated, using the OMA DM protocol, to the user's electronic device. The electronic device can use the minimal OMA-DM client to extract the data structure and communicate the pertinent information to the location limited entity 330.

As stated in the above example, the electronic client can use a minimal location agnostic client, such as a minimal OMA-DM client. For example, if a location agnostic management platform and corresponding protocol provide interfaces for functions A, B and C but function A will suffice, the minimal location agnostic client may support function A but not support functions B and C.

According to one embodiment, the OMA DM protocol is used to communicate, for example, over the second link 350 as depicted in FIG. 3 or to communicate, for example, over the network 450 as depicted in FIG. 4. According to one embodiment, the OMA DM protocol is modified so that electronic devices that include a location limited entity 330 or a location limited client 490, among other things, are always connected and therefore Short Message Services (SMSs) are not required.

According to one embodiment, what is commonly known as "push technology" is used as a part of various client or server entities communicating. For example, "push technology" may be used to communicate between a translation apparatus 320 and a location agnostic entity 310 or between a translation apparatus 320 and a location limited entity 330. In another example, "push technology" may be used to provide communications between a location agnostic server 440 and a location agnostic client 460 or vice versa.

"HTTP server push" is one subcategory of "push technology." According to one embodiment, HTTP server push is used as a part of communicating, for example, between a server 400A and a client 400B. HTTP server push typically involves a server 400A pushing information to a client 400B. In situations where a client 400B is pushing information to a server 400A, the client 400B may employ a push technology that is similar to HTTP server push.

According to one embodiment, an electronic device 150, 170 may initially include a location limited client 490 (FIG. 4) but not include a location agnostic client 460 (FIG. 4). According to one embodiment, the location agnostic client 460 can be installed on the electronic device 150, 170, as will become more evident. Various embodiments described herein can also be used to install a translation apparatus 470 and a corresponding mapping 480 in addition to installing the location agnostic client 460 on the electronic device 150, 170, as will become more evident.

For example, since there are many different types of electronic devices 150, 170 (FIG. 1), 400B (FIG. 4) with many different types of communications protocols and management platforms as well as electronic devices that lack management platforms, there is a need for a method and a system to communicate and manage these disparate electronic devices, for example, with one management model. Further, there is a need for managing these disparate electronic devices from a single user interface.

Assume for the sake of illustration, assume that aggregate management server 110 (FIG. 1) is a server 440A (FIG. 4) that is a multi-management capable server and that electronic devices B and C are different types of electronic devices 400B that the multi-management capable server 400A communicates with. An apparatus, which receives the device capabilities of the various electronic devices B and C, can be associated with the server 400A. The apparatus uses the devices B's and C's device capabilities to determine which management protocol each of the electronic devices B and C use. The determined management protocols are used to install a location agnostic client onto the electronic devices B and C. For example, if the electronic device B's device capabilities indicate that electronic device B uses the Web Services Management (WSMAN) protocol, then the WSMAN protocol is used to install a location agnostic client 460, such as an Open Mobile Alliance Device Management (OMA DM) client, onto electronic device B. If another electronic device C's device capabilities indicate that electronic device C uses Technical Requirement-069 (TR-069) protocol, then the TR-069 protocol is used to install a location agnostic client 460, such as OMA DM client, onto electronic device C. The location agnostic clients that are installed on the electronic devices B and C can be used to communicate with location agnostic server, such as location agnostic server 440, to provide management to both of the electronic devices B and C.

Different electronic devices B and C have different capabilities. Information describing an electronic device B, C's capabilities can be used to determine the protocol that an electronic device B, C is configured to use. For example, information describing a device B, C's capabilities can be used to determine that the electronic device B or C has the ability to communicate using WSMAN or TR-069, for example.

The device capabilities may be requested or provided without being requested. For example, when an electronic device B, C is turned on, it performs a process called "boot strapping" during which the electronic device B, C is provisioned. While boot strapping, the electronic device B, C may communicate with a server 400A that can either request the electronic device B or C's capabilities or the electronic device B, C may provide its capabilities without the server 400A requesting the capabilities.

According to one embodiment, registration information for an electronic device B, C can be used by a server 400A to determine the management protocol that an electronic device B, C is configured to use. The registration information may be provided to any entity that provides an apparatus for managing electronic devices with different types of location limited clients, according to various embodiments. In a specific example, the registration information may be provided by a company that sells electronic devices to, for example, a company that is a traditional IT enterprise that a management server is associated with.

According to one embodiment, information describing device capabilities can be determined based on management policies that reside for example with a management server, a service provider, the electronic device B, C in question, or at another electronic device associated with the same environment, such as a home or business premises, that the electronic device B, C in question is associated with.

According to one embodiment, information describing device capabilities can be used for reinstalling a management client, such as a location limited client or a location agnostic client, for example, if a managed client is corrupted or disappears.

Figure 5:
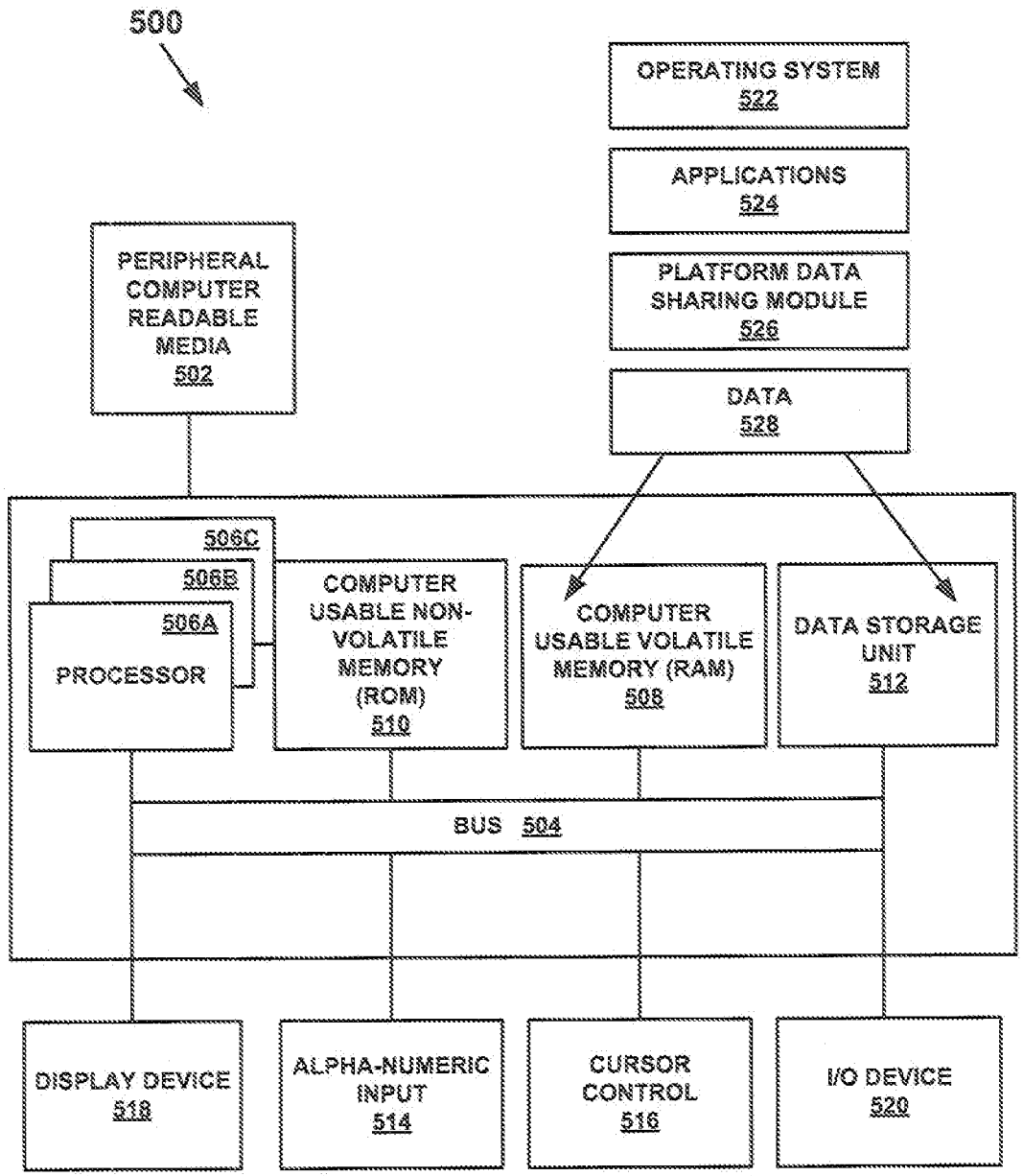
FIG. 5 depicts a block diagram of one example of a type of computer that can be used in accordance with or to implement various embodiments which are discussed herein.

FIG. 5 depicts a block diagram of one example of a type of computer (computer system 500) that can be used in accordance with or to implement various embodiments which are discussed herein. It is appreciated that computer system 500 of FIG. 5 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multimedia devices, and the like. As shown in FIG. 5, computer system 500 of FIG. 5 is well adapted to having peripheral computer-readable media 502 such as, for example, a floppy disk, a compact disc, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C. System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alphanumeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. In one embodiment, system 500 also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alphanumeric characters recognizable to a user. Optional cursor control device 516 allows the computer user to dynamically signal the movement of a visible symbol (cursor) on a display screen of display device 518 and indicate user selections of selectable items displayed on display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands. System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet.

Referring still to FIG. 5, various other components are depicted for system 500. Specifically, when present, an operating system 522, applications 524, modules 526, and data 528 are shown as typically residing in one or some combination of computer usable volatile memory 508, (e.g., RAM), computer usable non-volatile memory 510 (e.g., ROM), and data storage unit 512. In some embodiments, all or portions of various embodiments described herein are stored, for example, as an application 524 and/or module 526 in memory locations within RAM 508, computer-readable media within data storage unit 512, peripheral computer-readable media 502, and/or other tangible computer readable media. For example, the apparatuses 140, 150 (FIG. 1), instructions for implementing the flowchart 200 (FIG. 2), translation apparatuses 320, 420, 470 and corresponding mappings 340, 430, 480 (FIGS. 3 and 4), and mappings 340 may be associated with the computer 500. The apparatuses 140, 150 (FIG. 1), the management server 152 (FIG. 1), instructions for implementing the flowchart 200 (FIG. 2), translation apparatuses 320, 420, 470 may be associated with the computer 500 in the form of hardware, software, firmware, or a combination thereof. In the case of software, the instructions for the apparatuses 140, 150, the management server 152 (FIG. 1), the translation apparatuses 320, 420, 470 (FIGS. 3 and 4), and instructions for implementing the flowchart 200 (FIG. 2) may be associated with the applications 524 or the peripheral computer-readable media 502, among other things. The mappings 340, 430, 480 (FIGS. 3 and 4) may be stored as data 528, among other things.

Various embodiments have been described in various combinations. However, any two or more embodiments may be combined. Further, any embodiment may be used separately from any other embodiments.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of managing electronic devices using an electronic device as a root of trust, the method comprising:
   receiving 220 registration information for an electronic device 150, wherein the registration information identifies the electronic device 150 and an environment 130 that the electronic device 150 is trusted in;
   specifying 230 the electronic device 150 as a root of trust device 150 for the trusted environment 130 based on the registration information;
   specifying 240 the root of trust device 150 as the root of trust for a new electronic device 170 based on new information that identifies the root of trust device 150 and identifies the new electronic device 170; and
   managing 250 the new electronic device 170 using the root of trust device 150 without requiring the user of the root of trust device 150 and the new electronic device 170 to configure any electronic devices.

2. The method as recited by claim 1, wherein the method further comprises:
   receiving the new information that identifies the root of trust device 150 and identifies the new electronic device 170 from a point of sale (POS) management server.

3. The method as recited by claim 1, wherein the method further comprises:
   communicating with a point of sale (POS) management server, that is associated with a POS that the new electronic device 170 was purchased from, as a part of managing the new electronic device 170.

4. The method as recited by claim 1, wherein the method further comprises:
   communicating with an aggregate management server 110, that includes information pertaining to electronic devices purchased from a plurality of points of sale (POSes), as a part of managing the new electronic device 170.

5. An apparatus that resides on a root of trust device for managing electronic devices, the apparatus comprising:
   managing-devices-in-a-trusted-environment-associated-with-a-root-of-trust-device-without-requiring-device-user-to-configure-using-new-device-detector 162 configured for detecting that a new electronic device 170 has been associated with a trusted environment 130 that the root of trust device 150 is the root of trust for.
   managing-devices-in-a-trusted-environment-associated-with-a-root-of-trust-device-without-requiring-device-user-to-configure-using-root-of-trust-accessor 164 configured for accessing a root of trust identifier that identifies the electronic device 150 as the root of trust device 150 for a new electronic device 170 associated with a trusted environment 130; and
   managing-devices-in-a-trusted-environment-associated-with-a-root-of-trust-device-without-requiring-device-user-to-configure-using-device-management-interface 166 configured for managing the new electronic device 170 using the root of trust device 150 without requiring the user of the root of trust device 150 and the new electronic device 170 to configure any electronic devices.

6. The apparatus of claim 5, wherein the new electronic device 170 auto-registers with the apparatus 160 when the apparatus 160 detects the new electronic device 170.

7. The apparatus of claim 6, wherein the root of trust device 150 communicates information about the new electronic device 170 to a management server that is separate from the root of trust device 150 as a part of auto-registering the new electronic device 170.

8. The apparatus of claim 5, wherein a management server that is separate from the root of trust device 150 uses the interface 166 to management the new electronic device 170.

9. The apparatus of claim 8, wherein the management server is a point of sale (POS) management server 122.

10. The apparatus of claim 8, wherein a POS management server 122 provides one level of management for the new electronic device 170 and an aggregate management server 110 provides an additional level of management beyond what the POS management server 122 provides.

11. The apparatus of claim 5, wherein the root of trust device 150 further comprises a management server.

12. The apparatus of claim 5, wherein the root of trust device 150 provides an HTTP port 80 for communication between the new electronic device 170 and a management server that is separate from the root of trust device 150 and wherein the user of root of trust device 150 was not required to configure the root of trust device 150 with the HTTP port 80.

13. An apparatus for managing electronic devices using an electronic device as a root of trust, the apparatus comprising:
   managing-devices-in-a-trusted-environment-without-requiring-device-user-to-configure-using-root-of-trust-device-registration-information-receiver 142 configured for receiving registration information for an electronic device 150, wherein the registration information identifies the electronic device 150 and an environment 130 that the electronic device 150 is trusted in;
   managing-devices-in-a-trusted-environment-without-requiring-device-user-to-configure-using-root-of-trust-device-registration-information-specifier 144 configured for specifying the electronic device 150 as a root of trust device 150 for the trusted environment 130 based on the registration information;
   managing-devices-in-a-trusted-environment-without-requiring-device-user-to-configure-using-root-of-trustro-new-device-associator 146 configured for specifying the root of trust device 150 as the root of trust for a new electronic device 170 based on new information that identifies the root of trust device 150 and identifies the new electronic device 170; and managing-devices-in-a-trusted-environment-without-requiring-device-user-to-configure-using-root-of-trust-device-new-device-management-interface configured for managing the new electronic device 170 using the root of trust device 150 without requiring the user of the root of trust device 150 and the new electronic device 170 to configure any electronic devices.

14. The apparatus of claim 13, wherein the apparatus is associated with a management server selected from a group consisting of a point of sale (POS) management server 122, that is associated with a POS that the new electronic device 170 was purchased from, and an aggregate management server 110, that includes information pertaining to electronic devices purchased from a plurality of POSes.

15. The apparatus of claim 13, wherein the root of trust device 150 provides an HTTP port 80 for communication between the new electronic device 170 and a management server that is separate from the root of trust device 150 and wherein the user of root of trust device 150 was not required to configure the root of trust device 150 with the HyperText Transfer Protocol (HTTP) port 80.

* * * * *

UNITED STATES PATENT AND TRADEMARK OFFICE
CERTIFICATE OF CORRECTION

PATENT NO. : 8,479,262 B2  
APPLICATION NO. : 12/866909  
DATED : July 2, 2013  
INVENTOR(S) : Osvaldo Diaz et al.

Page 1 of 1

It is certified that error appears in the above-identified patent and that said Letters Patent is hereby corrected as shown below:

In the Claims

In column 20, line 8, in Claim 5, delete "for." and insert -- for; --, therefor.

Signed and Sealed this  
Twenty-fourth Day of September, 2013

Teresa Stanek Rea  
*Deputy Director of the United States Patent and Trademark Office*